Jan. 16, 1968     H. V. ELLIOTT     3,364,319
AUTOMATIC TURN SIGNAL CANCELLING SYSTEM WITH AN
IMMEDIATE RECANCELLATION CAPABILITY
Filed Dec. 30, 1963     4 Sheets-Sheet 2

INVENTOR.
Harold V. Elliott
BY C. R. Meland
HIS ATTORNEY

INVENTOR.
Harold V. Elliott
BY C. R. Meland
HIS ATTORNEY

INVENTOR.
Harold V. Elliott
BY C. R. Meland
HIS ATTORNEY

United States Patent Office 3,364,319
Patented Jan. 16, 1968

3,364,319
AUTOMATIC TURN SIGNAL CANCELLING SYSTEM WITH AN IMMEDIATE RECANCELLATION CAPABILITY
Harold V. Elliott, Anderson, Ind., assignor to General Motors Corporation, Detroit, Mich., a corporation of Delaware
Filed Dec. 30, 1963, Ser. No. 334,446
11 Claims. (Cl. 200—61.3)

This invention relates to electrical controls and more particularly to a type of electrical control that works in conjunction with a typical automobile directional signalling system to automatically cancel an indication of said turn signal system.

Automobile turn signals, as constructed in accordance with the present state of the art are generally satisfactory in their operation. However, the advent of the multi-laned superhighway brings one shortcoming of the commonly designed turn signalling system of an automobile into sharper focus.

At times an automobile utilizing a multi-laned super-highway has occasion to either turn therefrom or to change lanes thereon. Due to the speeds at which automobiles travel on these highways, turns are generally of small magnitude, and so an indication of a turn can result in a continuing indication thereof even after the turn has been completed. This is due primarily to the design of mechanically cancelling turn signal systems in general use which require a certain amount of rotation of the steering wheel to accomplish their purpose. If the radius of the turn made is insufficient to cause the steering wheel to rotate a predetermined amount, the mechanical cancelling system is not actuated and, therefore, an annoying situation persists in that the automobile having signalled a turn continues to emit a signal after the turn has been completed.

Therefore, it is an object of the present invention to provide an automatic means for cancelling an indication of a turn signal on an automobile when sufficient rotation of the steering wheel has not been had to actuate the mechanical means.

It is another object of the present invention to incorporate such an automatic turn signal cancelling system into a turn signal system of common design.

It is a further object of the present invention to provide a means for cancelling a turn signal indication on an automobile when the mechanical system therefor is inoperative.

It is still a further object of the present invention to provide an automatic means for cancelling a turn indication of an automobile through mechanically initiated means.

It is yet a further object of the present invention to provide an automatic turn signal cancelling means that will be operative immediately following a cycle of automatic operation.

It is a further object of the present invention to provide a means for cancelling a turn signal indication on an automobile when the mechanical system therefor is inoperative.

It is still a further object of the present invention to provide an automatic means for cancelling a turn indication of an automobile through mechanically initiated means.

It is yet a further object of the present invention to provide an automatic turn signal cancelling means that will be operative immediately following a cycle of automatic operation.

It is still another object of the present invention to provide an automatic turn signal cancelling device that operates in conjunction with the mechanically operated cancelling system and which requires that a minimum number of additional parts be added to the system to bring about the desired result.

Further objects and advantages of the present invention will be apparent from the following description, reference being had to the accompanying drawings, wherein a preferred embodiment of the present invention is clearly shown.

Figures 1, 2, 3, 4:
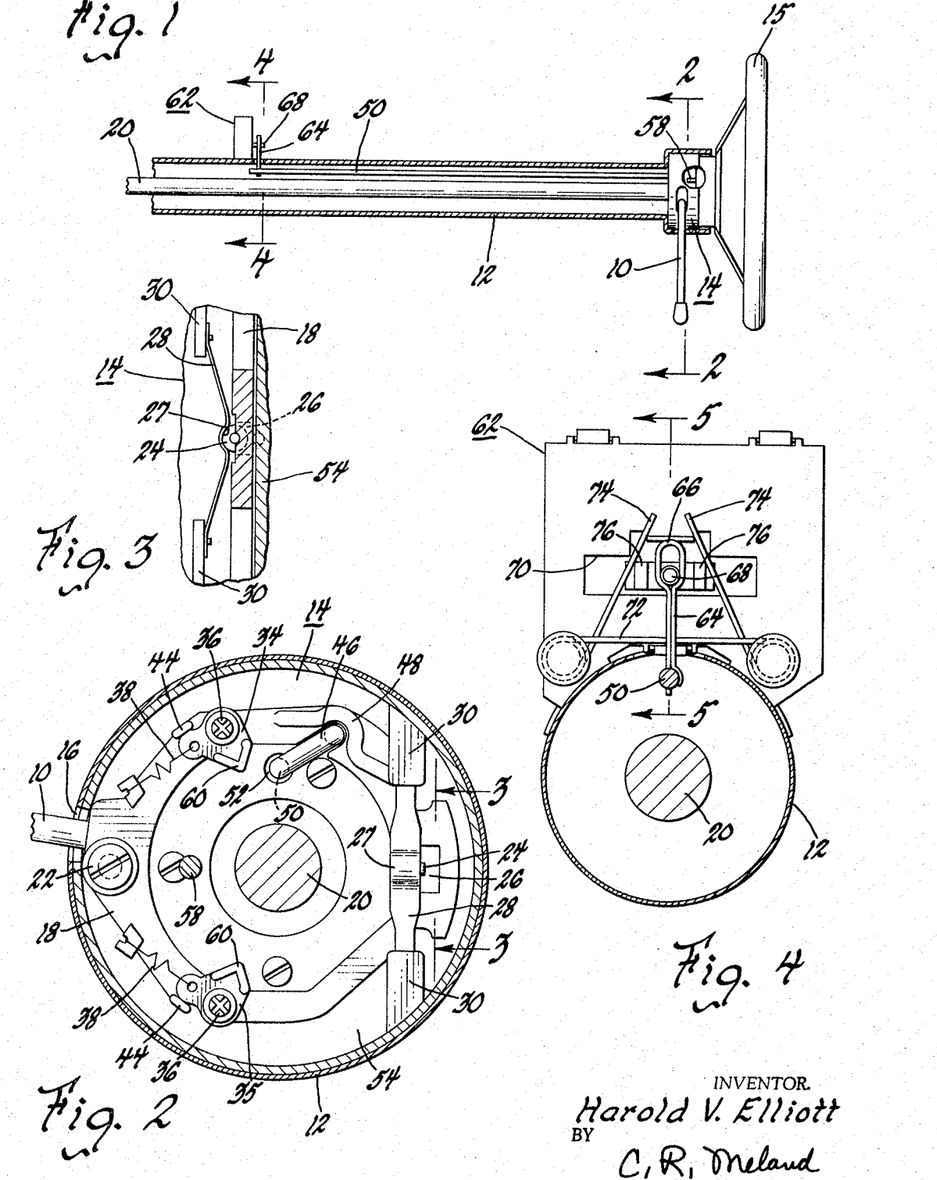
FIGURE 1 is an elevational view of a steering wheel having a turn signal system mounted thereon, the steering column being shown with parts broken away.
FIGURE 2 is an enlarged sectional view taken along line 2—2 of FIGURE 1 illustrating a typical mechanical cancelling system.
FIGURE 3 is a sectional view taken along line 3—3 of FIGURE 2.
FIGURE 4 is an enlarged view taken along line 4—4 of FIGURE 1.

Referring now to FIGURE 1, a turn signal control lever 10 is shown mounted in its operative location on a steering column 12 with one end attached to the mechanical cancelling system, generally designated by the numeral 14. A steering wheel 15 is rotatably mounted at one end of the steering column 12.

Referring now to FIGURE 2, the turn signal control lever 10 extends through a slot 16 in one wall of the steering column 12. The control lever 10 is firmly secured to a cancelling plate 18 which is circumferentially mounted around a steering shaft 20. The cancelling plate 18 is mounted on a pivot pin 22 and adapted for pivotal movement therearound.

As best seen in FIGURE 3 a detent roller 24 is mounted in a recess 26 formed on one surface of the cancelling plate 18 and is adapted to rotate on its axis. The detent roller 24 cooperates in its operation with an arcuate groove 27 formed in a metal plate 28 which is disposed between a pair of mounting plates 30. The plate 28 is thereby suspended in its operation against a portion of the detent roller 24. The mounting plates 30 are secured to an inside surface of the steering column 12 at a point just above the detent roller 24.

Referring now to FIGURE 2, the metal plate 28 is mounted so as to be in biased connection with the detent roller 24 and is composed of any well known flexible metal. A pair of cancelling lugs 34 and 35 are mounted on the cancelling plate 18 and adapted for pivotal movement around the pins 36. A pair of springs 38 serve to bias the cancelling lugs 34 and 35 against a pair of stops 44 formed as upturned flanges on the cancelling plate 18.

A crank 46 is rotatably mounted on one end in an aperture in the mechanical cancelling plate 18, not shown, with one portion bearing against a guide 48 on the cancelling plate 18. The other end of the crank 46 is firmly secured to one end of the remote control rod 50 in any well-known manner which will prevent relative movement therebetween. The remote control rod 50 passes through an aperture 52 of a stationary mounting plate 54 and is adapted to be loosely guided in rotational movement in the aperture 52. A cancelling pin 58 is carried by a portion of the steering wheel assembly 15 and rotates in unison with the steering wheel. The cancelling pin 58 is arranged to engage the portions 60 of the cancelling lugs 34 and 35 when the cancelling plate 18 is pivoted into either of two actuated positions. When the cancelling plate 18 is in a neutral position, the portion 60 of the cancelling lugs 34 and 35 are disposed outside of the arc that the cancelling pin 58 will transcribe during its radial movement and hence when no turn is indicated the pin 58 will move freely. The operative location of the cancelling pin 58 is also illustrated in FIGURE 1.

The remote control rod 50 is the mechanical link between the mechanical cancelling system 14 and the automatic cancelling system, generally designated by the numeral 62 as best seen in FIGURE 1.

Referring now to FIGURE 4, the remote control rod 50 has a link 64 disposed through its lower end. The pin 64 is pivoted when rod 50 is rotated. One end of the link pin 64 forms a substantially elliptical ring 66 and is adapted to engage a lug 68 extending through a slot 70 in one wall of the automatic cancelling system 62. This manner of engagement is also clearly illustrated in FIGURE 9.

As shown in FIGURE 4, a centering spring 72 is mounted on an outside wall of the automatic cancelling system 62 and has a pair of resilient legs 74 adapted to engage a pair of centering lugs 76 likewise protruding through the slot 70.

Figures 9, 10:
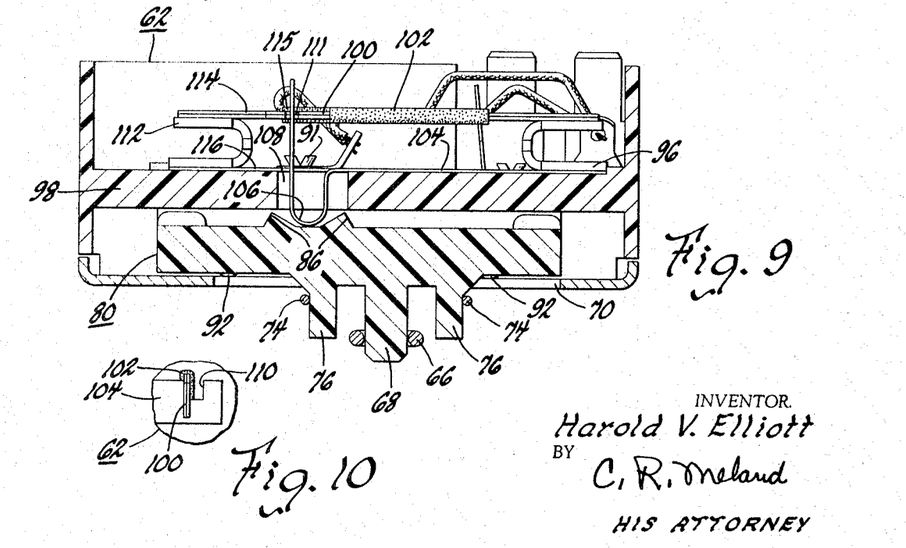
FIGURE 9 is a sectional view taken along line 9—9 of FIGURE 11.
FIGURE 10 is a view taken in the direction of arrow 10 in FIGURE 11.

Referring now to FIGURE 9, it is seen that the lug 68 and the centering lugs 76 are formed on one surface of a slide 80. A series of cams 86, hereinafter referred to as the normal cams, are formed on an opposite surface of the slide 80.

Figure 8:
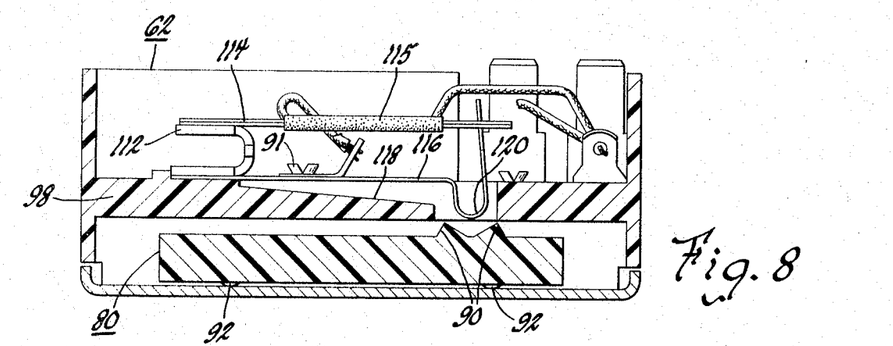
FIGURE 8 is a sectional view taken along line 8—8 of FIGURE 11.

FIGURE 8 illustrates another portion of the slide 80 on which are formed a series of cams 90 which are hereinafter referred to as override cams.

Figure 7:
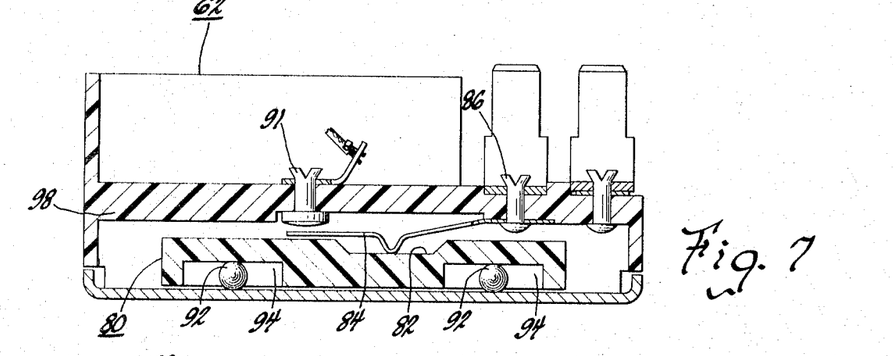
FIGURE 7 is a sectional view taken along line 7—7 of FIGURE 11.

FIGURE 7 illustrates still another portion of the slide 80 which shows a camming groove 82 disposed to cooperate with a spring contact 84 which is firmly secured to another portion of the automatic cancelling system 62 by means of a contact rivet 86. The contact rivet 86 also serves to secure a terminal end of one of the fixed contacts, to be hereinafter described, to one wall of the automatic cancelling system 62. The spring contact 84 has one end arranged to engage the contact rivet 91 as the slide 80 is moved sufficiently in either direction from a center position where the edges of the groove 82 will drive the spring contact 84 in contact with the rivet 91. A series of balls 92 are arranged in slots 94 to allow smooth translational operation of the slide 80.

Referring now to FIGURE 9, a substantially U-shaped member 96 is secured to the wall 98 of the automatic cancelling system 62 and serves to hold a bimetallic element 100 in its operative location. An electrically energized heater 102 is wrapped around the bimetallic element 100 and is arranged to heat the bimetallic element electrically during the appropriate time in the cycle to be hereinafter described. A spring 104 is held in its operative position against the wall 98 by the U-shaped member 96 and has a hooked portion 106 projecting through an aperture 108 in the wall 98 adapted to engage the normal cams 86. The spring 104 is normally biased towards the wall 98. The spring 104 has a slot 110 engaging one end of the bimetallic element 100 through a corresponding slot 111, as best seen in FIGURE 10. The cooperation of the slot 110 and the corresponding slot 111, in the bimetallic element provides a time delay in the actuation of the spring member 104 as the bimetallic element 100 is heated. The slot 111 is best seen in FIGURE 11.

Referring now to FIGURE 8, a U-shaped member 112 is secured to another portion of the wall 98, and in much the same manner as previously described, holds a bimetallic element 114 surrounded by a heater 115 and a spring member 116 in their operative location. The bimetallic element 114 engages the spring member 116 through a series of slots in much the same manner as illustrated in FIGURES 10 and 11. It should be noted that the spring member 116 is biased towards the inclined plane portion 118 of the wall 98 but is kept suspended above the inclined plane 118 by the engagement of the slot with the bimetallic element. The spring member 116 has a hook portion 120 adapted to engage the override cams 90 at an appropriate time in the cycle which will be later described in more detail.

Figure 12:
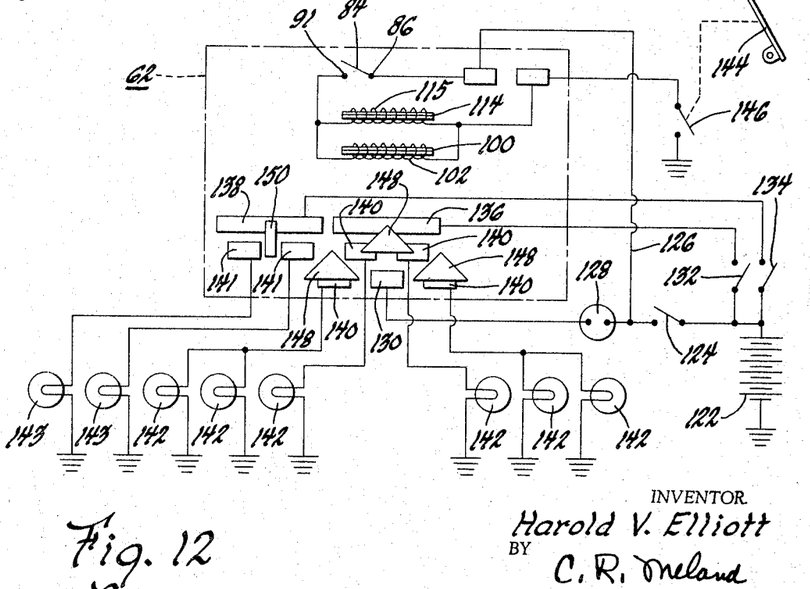
FIGURE 12 is an electrical schematic view of a typical turn signal system utilizing the present invention.

Referring now to FIGURE 12, a schematic diagram is shown which illustrates the invention in its operative environment in a turn signal indicating system for a vehicle. For purposes of clarity, the electrical diagram will be described both as to structure and operation with a subsequent reference to the structure of the invention which will illustrate the mechanical operation of the electrical devices. A battery 122 provides power through an ignition switch 124, through lead 126 to the automatic cancelling system 62 and through a flasher 128 to a fixed contact 130. A stop light switch 132 and a cornering lamp switch 134 provide power through appropriate leads to a stop light contact bar 136 and a cornering light bar 138 respectively. A series of fixed contacts 140 extend through the wall 98 of the automatic cancelling system and provide terminals to appropriate lights 142. The terminals 141 are connected to the cornering lamps 143. The fixed contacts 140 are of similar design and typical fixed contacts with terminal ends are shown in FIGURE 5.

Figure 11:
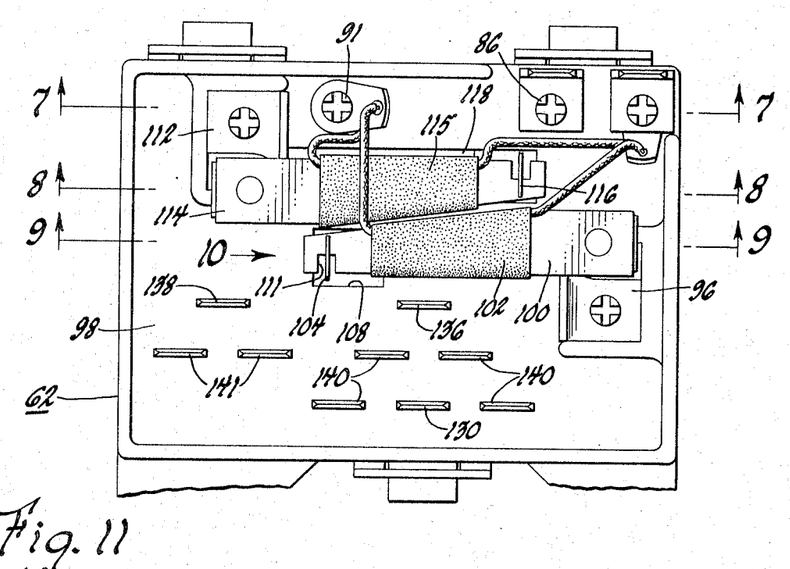
FIGURE 11 is a view taken in the direction of the arrow 11 in FIGURE 5.

Referring to FIGURE 11, the terminal portions of the contacts 140 are clearly shown along with similar appearing terminal ends to the hot lead contact 130 and the stop light contact bar 136 and the cornering light contact bar 138.

Figure 6:
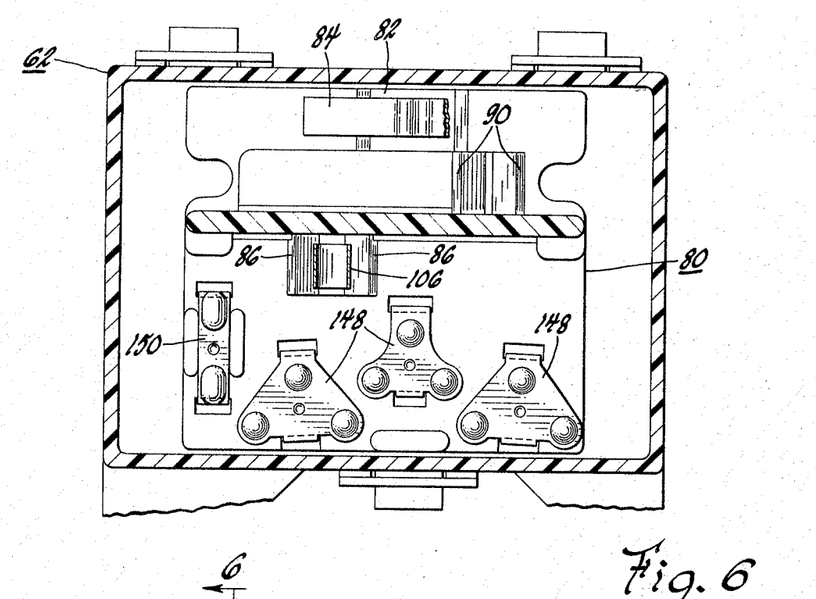
FIGURE 6 is a sectional view taken along line 6—6 of FIGURE 5.

Referring now to FIGURE 12, an accelerator pedal 144 is mechanically connected to a switch 146 which is responsive to an amount of throttle movement. The switch 146 has as its function the providing of ground to a circuit that leads from the ignition switch through the switch comprising the spring contact 84 and the rivet 91, to the heaters 102 and 115, respectively, associated with the bimetallic elements 100 and 114. A series of movable contacts 148 are carried by the slide 80 and are caused to selectively engage a series of the contacts 140 while one of the contacts 148 maintains contact with the contact bar 136 during the translational movement of the slide 80 in either direction away from center. These movable contacts 148 are also shown in FIGURE 6. Likewise, a movable contact 150 carried by the slide 80 is disposed to make contact with either of the two fixed contacts 141 connected to the cornering lamps 143 while maintaining contact with the cornering lamp bus bar 138. The movable contact 150 is also shown in FIGURE 6.

Figure 5:
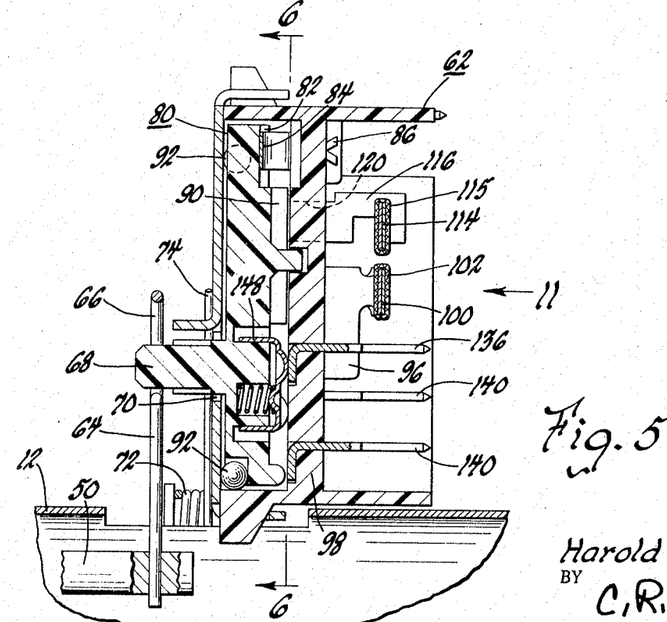
FIGURE 5 is an enlarged sectional view of the automatic cancelling system taken along line 5—5 of FIGURE 4.

Referring now to FIGURE 5, a typical movable contact, such as 148, is shown in its operative position mounted on the slide 80 and adapted to engage a fixed contact 140. It should be made clear that a fixed contact, such as shown in FIGURE 5, is of typical design and can also serve as the fixed contact 140.

In operation, the turn signalling system herein described has two phases of operation. One phase of operation entails the control of the electrical circuitry to the indicating lamps by purely mechanical means. A second phase of operation is brought about when the steering wheel of the vehicle on which the signalling system is mounted is not turned sufficiently after a turn is indicated to mechanically cancel the indicated turn. When this situation occurs, the need for the type of device which is the subject of this invention becomes important. Therefore, the following description of operation will be handled by describing the normal functioning of the system to provide a basis both in structure and operation for the subsequent description of the relation of the invention to the mechanical operation.

Referring now to FIGURE 2, the actuator lever is caused to move in the slot 16 in a counterclockwise fashion which would indicate a turn to the left. The actuator lever 10, firmly engaging the cancelling plate 18 above the pivot pin 22, causes a pivoting of the cancelling plate 18 around the pivot pin 22 into an arcuate path. As the cancelling plate 18 pivots in a substantially counterclockwise direction, the detent roller 24 is pulled out of the detent 27 against the biasing force of the metal plate 28. As the cancelling plate moves into this counterclockwise arcuate path, the crank 46 is also rotated counterclockwise and induces a counterclockwise movement into the link rod 50.

Referring now to FIGURE 4, the link rod 50 will cause the slide carried lug 68 to move in a leftward direction as viewed in FIGURE 4 through the engagement of the link pin 64 with the lug 68 and the link rod 50.

Referring now to FIGURES 7, 8 and 9 and initially to FIGURE 9, the movement of the lug 68 in a leftward direction will carry the slide 80 also leftwardly. Therefore, one of the normal cams 86 will be pulled past the hook projection 106 of the spring 104. The design of this system is such that the biasing action of the spring 104 in conjunction with the biasing action of the metal plate 28 is necessary to hold the slide 80 in either actuated direction against the tension of the spring legs 74.

Referring now to FIGURE 2, in the normal operation of the cancelling system, as the cancelling plate 18 moves in a substantially counterclockwise arcuate path, the portion 60 of the cancelling lug 35 is carried in the direction of the steering shaft 20. In this new position, it is located in the arc that the cancelling pin 58 will traverse as it moves around the steering shaft 20 with the steering wheel 15. In the example used, as the steering wheel is turned counterclockwise in the direction of the indicated left turn, the cancelling pin 58 will engage the portion 60 of the cancelling lug 35. This movement of the cancelling pin 58, being counterclockwise, will cause the cancelling lug 35 to pivot in a clockwise direction around the pin 36 against the tension of the spring 38 and will not effect the positioning of the cancelling plate 18. However, as the steering wheel has been turned sufficiently into the indicated left turn, the cancelling pin 58 will eventually go past the cancelling lug 35. As the left turn is completed and the steering wheel 15 is brought back to a neutral position, the cancelling pin 58, being carried by a portion of the steering wheel 15, will engage the opposite portion 60 of the cancelling lug 35 and will drive the cancelling lug 35 against the stop flange 44. This will cause the cancelling plate 18 to be rotated back toward its original position and, consequently, the detent roller 24 will be replaced in the groove 27. It is evident that the automatic cancelling system will also be centered in that the link rod 50 will be cranked in a clockwise direction as the cancelling pin 58 drives the cancelling lug 35 back into its initial position. Therefore, the slide 80 will have been moved translationally during this cycle of operation and the electrical circuitry will have brought about an indication of the turn signal and the cancelling thereof. It should be noted that the movable contacts 148 and 150 are carried by the slide 80, and therefore, movement of the slide 80 will operate the directional signalling lamps.

A problem arises in the operation of the mechanical cancelling system when a turn is indicated in a manner substantially as previously described but the turn was not of sufficient magnitude to have allowed the cancelling pin 58 carried by the steering wheel to move sufficiently on its arc to intersect the arcuate path travelled by the pivoting cancelling lug. Therefore, as this turn of small magnitude is completed, the cancelling pin 58 is not available to drive the cancelling plate-carried cancelling lug 35 back to its initial position.

It will be assumed that the same mechanical motion has been generated in the mechanical cancelling system and the automatic cancelling system as has been previously described, but the turn indicated, to the left for example, was not great enough to move the cancelling pin 58 past the cancelling lug 35. Therefore, as the steering wheel is returned to its neutral position, no mechanical cancelling will take place. To make use of the present invention, the vehicle whose turn signal has not been mechanically cancelled must be operating with the throttle in such position that switch 146 is closed, the setting thereof having been previously adjusted. Presuming switch 146 to be closed, by reference to FIGURE 12, it is seen that, when contact 84 is closed, power will be supplied to heaters 102 and 115. As seen in FIGURE 7, the closing of the spring contact 84 is brought about as the edges of the groove 82 come into contact with the downwardly projecting lip of the spring contact 84, thereby driving the end of the contact 84 into engagement with the rivet 91. As seen from an examination of FIGURE 9, the right cam 86, as the slide is driven towards the left, is driven past the hook portion 106 of the spring 104.

Referring to FIGURE 8, the right cam 90 has likewise been driven to a point past the hook portion 120 of the spring 116. The heaters 115 and 102 are energized and the bimetallic element 100 has its high expansion material on the side of the element nearest the wall 98. Therefore, as power comes to the heater 102, the bimetallic element 100 will move away from the wall 98 into the slot arrangement illustrated in FIGURE 10, and also seen in FIGURE 11. The bimetallic element 100 will move a certain distance before the spring 104 is drawn away from its engagement with the right cam 86. During this same period of time, as seen in FIGURE 8, the energization of the heater 115 will bring about an immediate movement of the spring 116 in the direction of the slide 80 because of the spring 116 being biased towards the inclined plane 118. Thus, it is seen that the hook projection 120 of the spring 116 will travel down toward the slide 80 and make contact with the slide 80 at approximately the same time as the bimetallic element 100 has moved through the slot 110. It is to be noted that the flat portion between the cams 86 is greater than the portion between the cams 90. Therefore, as the slide 80 is moved to a point where the hook projection 106 contacts the outside of the cam 86, the hook projection 120 will contact the slide 80 at a more remote point, that is, the hook projection 120 will not bear against the edge of the cam 90.

As has been previously indicated, the slide 80 is held in an actuated position against the tension of the centering spring legs 74 by a combination of the detent arrangement in the mechanical cancelling portion and the pressure of the biased spring 104 against the side of the cam 86. Therefore, as the spring 104 is drawn away from the slide 80 by the bimetal 100 moving away from the slide after having passed through the slot 110, very little further movement of the spring 104 is needed to lessen the holding force against the slide 80 and to allow it to be driven back to a neutral position. As the slide 80 moves to a neutral or centered position, the mechanical cancelling plate 18 is likewise driven to a neutral position by virtue of the linkage established between the automatic cancelling system 62 and the mechanical cancelling system 14 through the link rod 50. In this manner, the initial cycling of the automatic cancelling system functions. It should be remembered that the spring 116 will not lodge against the cam 90 because the biased spring is leading the bimetallic element 114 and is not positively pressured thereby.

However, at times it may become necessary to reactuate the turn signalling system and the second turn to be made being of small magnitude also. The present invention incorporates a method of holding the slide 80 in an actuated position upon an immediate reactivation of the system.

We will again assume that the mechanical cancelling system has been driven into a left turn indicated position, and the turn, subsequently, made is not of sufficient magnitude to carry the cancelling pin 58 past the cancelling lug 35. It will likewise be assumed that this new turn has occurred immediately following the automatic actuation of the cancelling system previously described.

Due to residual heating of the bimetallic elements 100 and 114 by the heaters 102 and 115, respectively, the bimetallic elements will continue to deflect after the spring contact 84 has been disengaged from the rivet 91. Therefore, as the slide 80 is moved in a leftward direction as viewed in FIGURE 9, the hook projection 106 will be completely retracted into the aperture 108 and, therefore, will provide no holding force against the side of the cam 86 to work in conjunction with the detenting arrangement in the mechanical cancelling system to hold the slide 80 against the tension of the spring legs 74. However, the continued deflection of the bimetallic element 114, as seen in FIGURE 8, will continue after the spring 116 has come into contact with the inclined plane 118. The slot arrangement constituting the engagement of the spring 116 with the bimetallic element 114 will allow the residually heating, bimetallic element 114 to come into positive engagement with the lower end of the slots in the spring 116. Therefore, the hook projection 120 will be very positively held against the surface of the slide 80 due to residual heating. As the slide 80 is moved leftwardly, the lack of cooperation between the now retracted hook portion 106 with the came 86 will allow the slide 80 to be moved towards a more centered position. However, the hook portion 120 of the spring 116 will catch the side of the right cam 90 and hold the slide 80 against any further movement toward a neutral position in much the same manner as the hook portion 106 cooperated with the cam 86 to hold the slide 80.

As the hook projection 120 engages the side of the cam 90, the downwardly projecting portion of the spring contact 84, as viewed in FIGURE 7, has not been driven towards the rivet 91 because the movement of the slide 80 into its new position has not been sufficient to have the sides of the groove 82 drive the spring contact 84 towards the rivet 91. Consequently, the heaters 102 and 115 are not energized. During this period of time, the hook portion 106 will be suspended at a point over the inside surface of the cam 86 and, as heat is lost from the bimetallic element 100, the spring 104 will be allowed to carry the hook portion 106 towards the slide 80. Likewise the bimetallic element 114 will start losing heat and the positive engagement of the bimetallic element and the slot 110 of the spring 116 will disappear and the spring 116 will begin an upward movement following the bimetallic element 114. This movement will disengage the hook portion 120 from the right cam 90 and the slide 80 will be driven towards the center position by the spring leg 74. This movement of the slide 80 toward the centered position will serve to center the mechanical cancelling system in the same manner as previously described.

It thus becomes apparent that, regardless of the number of reactuations of the turn signal system with a small magnitude turn involved, either the spring 104 or the spring 116 will serve to hold the slide 80 in the actuated position for only a short period of time and will thereafter release it.

The utility of the present invention comes into sharp focus when an automobile having such a turn signalling system is driven on a multi-laned superhighway where turns are very often of a small magnitude due to the speeds at which the vehicle travels. Therefore, a preferred embodiment of the present invention would involve presetting the throttle switch 146 at a position where it would not be operative during very low engine speeds. This would be desirable for driving on city streets where, very often, a turn is indicated on a parked automobile, for example, at a stop light. Therefore, the automatic cancelling system herein described would have utility mainly at speeds above, for example, 15 m.p.h.

The invention herein described is not meant to be limited to an arrangement of apparatus as illustrated in FIGURE 12, for this exact arrangement of lights and switches is appropriate only to demonstrate the environment in which the invention is intended to operate.

It should be noted that the mechanical cancelling system, as herein described, is also used to establish an operative environment for the automatic cancelling system and, as such, constitutes no part of the disclosed invention.

While the embodiment of the present invention, as herein disclosed, constitutes a preferred form, it is to be understood that other forms might be adopted,

What is claimed is as follows:

1. In an automobile, the combination of a turn signalling system having a mechanically cancelling system and an automatic cancelling device, said device comprising; a mechanical linking means arranged to connect the mechanical cancelling system and said automatic cancelling system, slide means disposed for translational movement in opposite directions from a neutral position, a series of cam means carried by said slide means, and first and second temperature responsive means selectively engageable with said series of cam means to cancel a turn signal initiated by the automobile turn signalling system, said second temperature responsive means engaging said slide means to act as a release means if a second turn signal indication in the same direction is immediately made, said automatic cancelling device including means for making said device operable in response to accelerator movement of said automobile.

2. In an automobile, the combination of a turn signalling system having a mechanical cancelling system therefor and an automatic cancelling system, said system comprising; a means for linking said mechanical cancelling system to said automatic cancelling system, slide means drivably engaged by said linking means, said slide being disposed in a body and being adapted for translational movement in opposite directions from a neutral position, a series of cam means carried by said slide means, and first and second temperature responsive means, a first temperature responsive means selectively engaging said series of cam means to first hold and later release said slide means after movement of said slide means in either of two directions away from a neutral position, said second temperature responsive means engaging said slide means to act as a release means if a second turn signal indication in the same direction is immediately made.

3. In combination, an automobile turn signal system and an automobile turn signal system cancelling device comprising; a turn signal lever, a detenting means to hold said turn signal lever in the actuated position, a slide means disposed for translational movement within a body, a linking means disposed between said detenting means and said slide means, a plurality of cam means being carried by said slide means, first and second temperature responsive means adapted to engage said plurality of cam means while said slide means is translationally moved for effecting reverse movement thereof after a predetermined period of time, a centering means disposed in operative association with said slide means to constantly urge said slide means to a neutral position, and a plurality of switching means operatively associated with said temperature responsive means to selectively energize said temperature responsive means, said first and second temperature responsive means arranged to selectively hold and release said slide means after translational movement thereof, said second temperature responsive means engaging said slide means to act as a release means if a second turn signal indication in the same direction is immediately made.

4. The combination of a mechanical cancelling system for an automobile turn signalling system having a lever actuator and an automatic cancelling system therefor comprising; a linking means driven by the lever and disposed between said mechanical and automatic cancelling system, a slide responsive to the lever for translational movement from a neutral position, said slide drivably connected with said mechanical cancelling system through said linking means, a centering means disposed to constantly urge said slide means toward a neutral position, a plurality of cam means carried by said slide means, a first and second temperature responsive means engageable with said cam means, a first of said cam means engaging a first of said temperature responsive means to hold said slide means in one extreme of translational movement, a second of said cam means engaging the second temperature responsive means to hold said slide means during translational movement to an intermediate position, and a switching means cooperating with a third of said cam means to selectively energize an electrical circuit to said series of temperature responsive means, said switching means being energized by translational movement of said slide means to an extreme position.

5. The combination of a mechanical cancelling system including a detenting mechanism for an automobile turn signal system and an automatic cancelling system including a housing therefor comprising, a linking means disposed between said mechanical cancelling system and said automatic cancelling system to make directions of movement in one system correspond to directions of movement in the other system, a slide means carried for translational movement from a neutral position by the automatic cancelling system housing, a centering means including a two-legged spring adapted to urge said slide means and said mechanical centering system to a neutral position, a series of cam means being carried by said slide means, a first and second temperature responsive means adapted to selectively engage said series of cam means during various degrees of translational movement of said slide means, said temperature responsive means engaging said detenting mechanism through said slide means to hold said automobile turn signal system in an actuated position, and a plurality of switching means being adapted to electrically energize said plurality of temperature responsive means in a selective manner to disengage said temperature responsive means from said cam means, said slide means and said mechanical cancelling system being urged to a neutral position by said centering means as the cooperation of the detent mechanism and said temperature responsive means is terminated, said second temperature responsive means selectively heated through one of said switching means to ready the automatic cancelling system for repeated operation.

6. In an automobile turn signalling system comprising; an indicating system of lights and electrically operable means electrically connected therewith, a mechanical cancelling system having a detent and roller holding mechanism therein, and an actuating means for manual positioning apparatus in said mechanical cancelling system, an automatic cancelling system, said automatic cancelling system comprising; linkage means for remotely controlling a switching means, a slide means being adapted for translational movement of a reciprocative nature away from a neutral position, a centering means arranged to return said slide means to a neutral position after translational movement, a series of cams being carried by said slide means, a first and second temperature responsive means including a plurality of spring members cooperating with said series of slide carried cams to selectively hold and release said slide means after translational movement, said slide means being held in several positions of translational movement against the tension of the centering means by the joint holding force of the plurality of spring members and the detent and roller holding mechanism of the mechanical cancelling system, and a switching means including a spring member actuable to close an electrical circuit by the engagement of one of the slide carried cams in response to an extreme translational movement of said slide means, said switching means electrically energizing said temperature responsive means to selectively hold or release said slide means and said actuating means thereby providing an automatic cancelling system for said automobile turn signalling system, a second temperature responsive means being heated selectively to provide a reactuation capability for said automatic cancelling system while said first temperature responsive means is still heated.

7. The automobile turn signalling system according to claim 6 wherein the first and second temperature responsive means are bimetallic elements oppositely deflectable during heating thereof.

8. In an automobile electric turn signalling system having a mechanical cancelling means including a detenting means, an automatic cancelling means comprising; a housing, a slide adaptable for translational movement from a neutral position within said housing, a series of cams carried by said slide, first and second temperature responsive means including spring memebrs cooperating therewith, said spring members having hooked portions arranged to selectively engage any one or several of said series of cams carried by the slide during translational movement of said slide, a spring member being in conductive relationship to a portion of said temperature responsive means as said slide is moved to several extremes of translational movement, and a switch being responsive to a predetermined amount of accelerator pedal depression and adapted to energize electrical circuits to said temperature responsive means, a first of said hooked portions and said detenting means cooperating to hold said turn signal system in a position of actuation during several conditions of operation, a second hooked portion and said detenting means cooperating to hold said turn signal system in a position of actuation during one condition of operation, said hooked portions selectively disengaging said slide carried cams to allow said slide means and said turn signalling system to return to a neutral position in response to a heating of said temperature responsive means, said second temperature responsive means being continually deflected by residual heat after a first turn cancellation to allow a second actuation and cancellation of the turn system.

9. In a motor vehicle turn signal system including a mechanical cancelling system having a detent means, an automatic cancelling system comprising, a housing, a linking means interposed between said mechanical cancelling system and said automatic cancelling system, a centering means for constantly urging said linking means towards a neutral position, a slide means disposed for translational movement from a neutral position in said housing to a plurality of actuated positions, a series of cams being carried by said slide means, a first series of cams being arranged to define one degree of translational movement, a second of said series of cams being arranged to define another degree of translational movement, first and second temperature responsive means including spring members having hooked portions being adapted to selectively engage said first and second series of cams to hold said slide means in several degrees of translational movement; and electrically energizable means being arranged to activate said temperature responsive means, said linking means engageable with said slide means to urge said slide means constantly towards a neutral position, said detent means and said temperature responsive means being together sufficient to overcome the pressure of said centering means, said first and second temperature responsive means being energized by said electrically energizable means in response to a predetermined amount of accelerator movement whereby said slide means is returned to a neutral position from several degrees of translational movement by the selective disengagement of said first and second temperature responsive means from said slide means.

10. The automatic cancelling system according to claim 9 wherein said temperature responsive means have a plurality of slots cooperating with a plurality of slots in said spring members to engage and disengage said hooked portions from said slide carried cams in a delayed manner due to residual heating thereof.

11. The automatic cancelling system according to claim 9 wherein said electrically energizable means includes a series of cams carried by said slide means and a resilient metal conductor having a cam follower portion adapted to cooperate with said series of cams to energize an electric circuit to said temperature responsive means during an extreme of translational movement of said slide means.

References Cited

UNITED STATES PATENTS

| | | | |
|---|---|---|---|
| 2,750,460 | 6/1956 | Hollins | 200—61.27 X |
| 2,185,524 | 1/1940 | Sachs | 200—116 |
| 2,506,796 | 5/1950 | Hollins | 200—61.27 X |
| 2,824,917 | 2/1958 | Hollins | 200—61.27 X |

BERNARD A. GILHEANY, *Primary Examiner.*

H. A. LEWITTER, *Assistant Examiner.*

UNITED STATES PATENT OFFICE
CERTIFICATE OF CORRECTION

Patent No. 3,364,319

January 16, 1968

Harold V. Elliott

It is hereby certified that error appears in the above numbered patent requiring correction and that the said Letters Patent should read as corrected below.

Column 3, line 50, for "link 64" read -- link pin 64 --; column 6, line 67, for "betwen" read -- between --; column 7, line 34, for "came" read -- cam --; column 10, line 27, for "memebrs" read -- members --; column 12, line 10, for "2,506,796  5/1950  Hollins  200-61.27X" read -- 2,506,796  5/1950  Krieger  200-116(.8) --; same column 12, list of References Cited, add the following reference:
2,750,467      6/1956      Hollins          200-61.27X Signed and sealed this 18th day of June 1968.

(SEAL)
Attest:

Edward M. Fletcher, Jr.
Attesting Officer

EDWARD J. BRENNER
Commissioner of Patents